United States Patent

[11] 3,588,126

| [72] | Inventors | George R. McKillop;<br>Harry Tankus; James H. Thayer, Cook County, Ill. |
|---|---|---|
| [21] | Appl. No. | 825,177 |
| [22] | Filed | May 16, 1969 |
| [45] | Patented | June 28, 1971 |
| [73] | Assignee | Crane Packing Company<br>Morton Grove, Ill. |

[54] UNIT-TYPE PACKING SEAL FOR SHAFT
7 Claims, 3 Drawing Figs.

[52] U.S. Cl. ........................................ 277/32,
277/35, 277/102, 277/187
[51] Int. Cl. ........................................ F16j 15/00,
F02f 5/00
[50] Field of Search........................................ 277/35,
187, 102, 114, 36, 230, 123, 51, 108, 32

[56] References Cited
UNITED STATES PATENTS

| 1,624,852 | 4/1927 | Trautner | 277/187X |
| 2,126,007 | 8/1938 | Guiberson et al. | 277/123X |
| 2,485,940 | 10/1949 | Tremolada | 277/51 |
| 2,716,034 | 8/1955 | Main | 277/230X |

*Primary Examiner*—Samuel B. Rothberg
*Attorney*—Charles F. Voytech

ABSTRACT: This invention comprises a self-contained unitary packing device which may be interchangeable with a rotary mechanical seal. The packing device comprises a cup-shaped metal container in which is disposed one or more rings of packing together with a spring which exerts an axial force upon the packing in the manner of a packing gland. The container is pressed into a cup-shaped rubber seat in a recess in the housing to seal it in the housing and to hold it against rotation with a shaft passing through. The spring holds the packing rings against the container and compresses the rings against the shaft. The cup-shaped rubber seat may be used alternatively to hold a sealing washer of a rotary mechanical seal adapted to fit into the same space.

PATENTED JUN28 1971 3,588,126

INVENTORS
George R. McKillop
Harry Tankus
James H. Thayer
by Charles N. Vontesk
Atty

UNIT-TYPE PACKING SEAL FOR SHAFT

This invention relates to sealing means for relatively rotatable machine elements.

Rotary mechanical seals have, to a large extent, replaced packing for pumps, particularly where the relative linear velocity of the rotating parts is high and visible leakage cannot be tolerated. There are some pumps, however, in which conditions are acceptable for packing, but which are required to operate with a minimum of maintenance such that the periodic inspection and tightening of a gland is objectionable. In such installations a rotary mechanical seal may be a more expensive seal than is necessary for the conditions encountered.

It is an object of this invention to provide as a unitary package, one or more rings of packing assembled in a cup-shaped metal container together with resilient means acting upon the packing to compress it in the manner of a packing gland, said container being adapted to be installed in an elastomeric cup preloaded into a recess in a housing, in the manner of a rotary mechanical seal.

As a more specific object, this invention seeks to provide as a unitary package, one or more rings of packing assembled with a spring in a cup-shaped retainer, and a cover for the retainer against which the spring bears, with means for adjusting the axial position of the cover on the retainer to vary the pressure of the spring against the packing, whereby the spring pressure can be reduced or removed entirely when the packing is being installed on a shaft and thus facilitate threading the packing over the end of the shaft as well as reduce the resistance of the package to sliding along the shaft.

These and other objects of this invention will become apparent from the following detailed description when taken together with the accompanying drawings in which.

Figure 1:
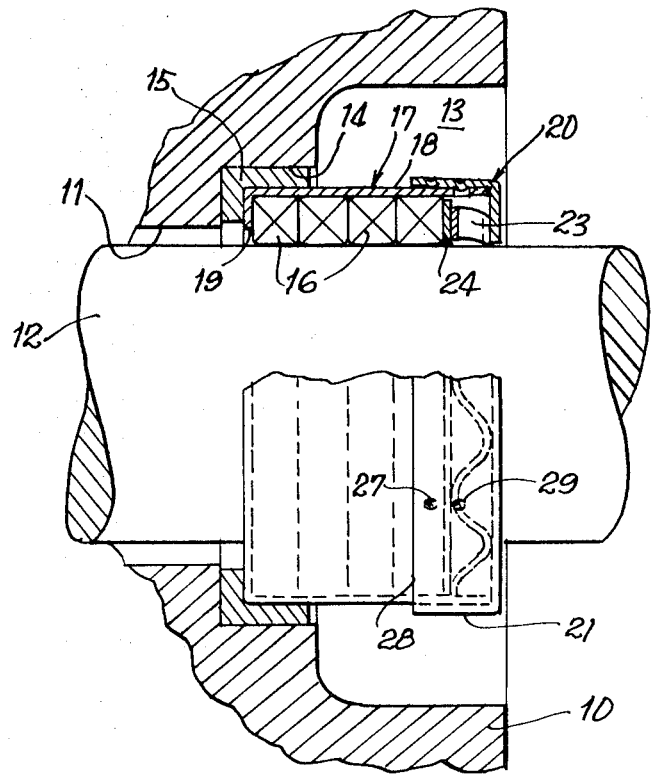
FIG. 1 is a plan view of a portion of a shaft and housing therefor, with the unitary packing of this invention shown installed therein, said packing being partly cut away.

Referring now to the drawings for a detailed description of the preferred embodiment shown therein, there is shown a fragment of a housing 10 in which is formed an opening 1 through which a shaft 12 extends. The housing 10 may be that of a pump or other fluid manipulating device, and shaft 12 may be used to drive an impeller or other rotatable fluid driving device.

Housing 10 is provided with a chamber 13 of annular form disposed concentrically around shaft 12 which normally functions as the seal chamber for the housing to contain the device for effecting a seal. A cylindrical recess 14 is formed in housing 10 adjacent chamber 13, in which recess is disposed a cup-shaped ring 15 of resilient deformable material, such as rubber or the like.

The unitary packing of this invention is comprised of one or more rings 16 of a compressible packing material selected to be compatible with the fluid being sealed and to withstand the temperatures and pressures of the fluid encountered in housing 10. Rings 16 may be die-formed to have a substantially square cross section to give them parallel radially disposed sides. Said rings 16 are placed in a cup-shaped retainer 17, preferably made of drawn sheet metal and formed to have a substantially cylindrical wall 18 and a radially disposed wall 19 serving as the bottom of the cup. The outer diameter of wall 18 is selected to cause the resilient deformable ring 15 to be compressed when the retainer is pressed into the ring to the position shown in FIG. 1. The provides an effective seal between the retainer and housing recess 14 and also provides a means by which the retainer is held against rotating with the shaft because of friction developed between the shaft, the packing rings 16 and the retainer 17.

The rings 16 normally are designed to have a sliding contacting fit on shaft 12 and a press fit in retainer 17. However, when the packing rings are compressed axially they expand both inwardly and outwardly to provide a sealing contact with the shaft.

Retainer 17 is provided with a cap 20 (FIGS. 2 and 3) which in the form selected to illustrate this invention is similarly cup-shaped, and thus is formed with a cylindrical wall 21 telescoped over cylindrical wall 18 of retainer 17, and with a radially extending wall 22. The packing rings 16 are disposed adjacent one another, and between the end ring and radial wall 22 is placed a resilient ring 23 the function of which is to exert an axial pressure against the rings 16 at all times so that as they wear they are continually deformed by the resilient ring and made to expand radially outwardly and inwardly to maintain sealing contact with the shaft 12. Ring 23 may be made of any resilient deformable material capable of performing this function, but we prefer to use a wave spring made of metal because of its low cost, ease of assembly, and the relatively high pressure that can be developed by the spring with relatively little compression. Because of the sinuous form of the spring, its pressure tends to be transmitted in concentrated form at a series of points of contact against the end ring and, hence, to distribute the spring pressure evenly upon the end ring 16 of the packing, a rigid washer 24 is interposed between the spring 23 and ring 16.

Cap 20 may be designed to be axially fixed relative to retainer 17 so that when the unitary packing is assembled the full spring pressure will be impressed upon the packing rings 16. Under these conditions, however, the assembly of the unitary packing upon the shaft is rendered somewhat difficult in that the packing within the retainer 18 is fully compressed and is therefore expanded inwardly so that the internal diameter of the packing rings is appreciably less than the diameter of the shaft 12. This makes difficult the assembly of the rings on the shaft. This situation can be overcome by the manufacturer by mounting the unitary packing without the spring on a cardboard cylinder which is approximately the size of shaft 12, and then completing the assembly with the spring and retainer, using a snap ring and washer to hold the compressed spring in place. The assembled and compressed packing is left on the cylinder until ready to be assembled on a shaft, at which time the entire assembled packing is slid off the cylinder on to said shaft. We prefer, however, to eliminate the necessity for first mounting the packing on a cylinder, and we accomplish this result in the following manner:

Cylindrical wall 18 of retainer 17 has one or more holes 25 punched therein near the outer end 26 of wall 18. In the form chosen to illustrate this invention, three equidistantly spaced holes 25 are formed. The cylindrical wall 21 of the cap 20 has an equal number of inwardly protruding dents 27 formed near its open end 28. Dents 27 are adapted to be received in the holes 25 to hold the cap 20 on retainer 17 against the pressure of spring 23. It is understood that in place of holes 25, recesses of approximately the same diameter and of appropriate depth may be used.

A second series of dents 29 identical with and axially aligned with the first series 27 are formed in wall 21 and are also adapted to enter the holes 25 to hold cap 20 on cylindrical wall 18 at a different axial location with respect thereto. The second location is shown more clearly in FIG. 3. In that location the end 26 of wall 18 forms an abutment for the readily extending wall 22 on cap 20 to limit the movement of said cap on the retainer 17 axially to the left, as viewed in FIG. 3. This feature is used during assembly of the packing on a shaft as will be hereinafter described.

Figure 2:
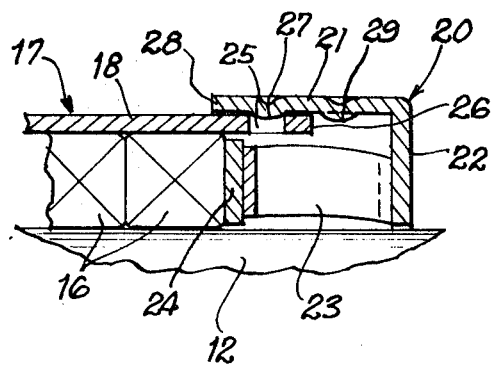
FIG. 2 is an enlargement of a portion of a cross section through the packing showing the spring thereof in the latched condition.
Figure 3:
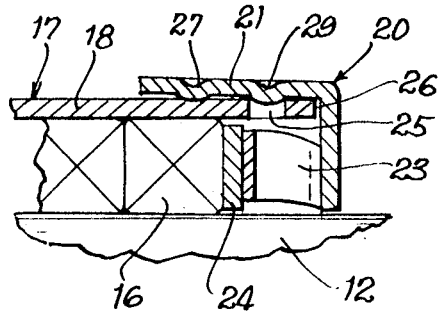
FIG. 3 is a view corresponding to FIG. 2 but showing the spring in its compressed position.

When the unitary packing of this invention is provided with a cap such as 20 shown in FIGS. 2 and 3, the packing is assembled at the manufacturer's shop with the rings 16 in the retainer 17, with washer 24 adjacent the end rings 16, with spring 23 resting upon washer 24 and with cap 20 disposed on wall 18 in a manner to cause dents 27 to cooperate with the end holes 25. In this position, spring 23 is uncompressed and consequently packing rings 16 are likewise uncompressed. The entire packing may be handled in its assembled condition as a unit until it is to be threaded over a shaft 12 and into resilient cuprshaped ring 15 in pump housing 10. Because of the absence of spring pressure, packing 16 has not been expanded radially inwardly to reduce its internal diameter and therefore the rings 16 can be readily slid upon shaft 12 without the aid of a cardboard or other cylinder.

When the packing is to be assembled into the cup-shaped resilient ring 15, it is slipped over shaft 12, and with pressure applied to wall 22 of cap 10 the unitary packing is slid along shaft 12 to the cup-shaped ring 15. At this point, however, due to the interference fit between wall 18 and the internal diameter of the cup-shaped ring, additional pressure must be exerted upon wall 22 to force the retainer into the ring. This additional pressure causes dents 27 to spring out of holes 25 and allows the cap 20 to be moved axially relative to retainer 17 until the dents 29 snap into holes 25. At this point the end 26 of the retainer bears against the radius between the end wall 22 and cylindrical wall 21 of cap 20, so that further compressive force cannot be exerted upon spring 23. It is contemplated that at this point spring 23 will be compressed to its maximum working height. Axial pressure upon wall 22 may be continued until radially disposed wall 19 on retainer 17 bears against the radial wall of cup 15.

The pressure required to push retainer 17 into cup 15 is sufficient to create a friction force between the cup-shaped ring 15 and the retainer 17 of a magnitude to hold the retainer against rotation relative to ring 15 during normal operation of the shaft 12.

When the packing is to be removed and replaced, should the retainer 17 resist withdrawal when the cap is pulled outwardly, the cap may be pulled out first and then the openings 25 in the retainer may be used by an appropriate pulling tool having elements engageable with the openings to withdraw the retainer from cup-shaped ring 15.

The foregoing unitary packing may be used with pumps the shafts of which rotate at 1,750 R.P.M. or 3,600 R.P.M. and having shaft diameters varying from one-half inch to 2 inches. Where less leakage can be tolerated than is normally encountered with packing under these operating conditions, packing rings 16 are preferably made of braided graphited yarn which is well adapted to withstand the higher temperatures produced by packing operating under relatively dry or nonlubricated conditions. Some lubricity can be incorporated in the graphite yarn packing by adding polytetrafluoroethylene filament yarn to the packing to gain the advantage of the natural lubricity of polytetrafluoroethylene as well as the ability of Teflon to withstand relatively high temperatures.

It is contemplated that the space occupied by the assembled packing will not exceed that required for a rotary mechanical seal of the end face type normally recommended for the same service, and that where substantially zero leakage is required, a rotary mechanical seal will be interchanged for the packing of this invention. In the latter event, resilient cup-shaped ring 15 will be used to hold and seal the nonrotative part of the rotary mechanical seal.

We claim:

1. A unitary packing for relatively rotatable machine elements, one of which has a recess to receive frictionally an element of a rotary end face seal, said unitary packing comprising a cylindrical retainer having radially disposed abutments at both ends thereof, an annular radially acting packing element concentrically disposed with respect to said retainer between said abutments, said packing element having radially disposed sides, one of which bears against one of said abutments, resilient means compressed between the other abutment and the other of said radially disposed sides, and means removably securing one end region of the retainer frictionally in the recess of said one of said machine elements with a fluidtight fit and with the annular packing element in radial sealing contact with the other machine element and with said retainer.

2. A unitary packing according to claim 1, said retainer being formed as a single cup-shaped stamping, and said means for removably securing one end region of the retainer frictionally in the recess of said one of said machine elements comprising a cup-shaped annulus of resilient deformable material adapted to receive an element of a rotary end face seal, said cup-shaped retainer being received in said annulus.

3. A unitary packing according to claim 1, each of said rings being comprised of braided graphite filament material.

4. A unitary packing according to claim 1, the other of said radially disposed abutments comprising a cup-shaped cap having a radially disposed wall and a cylindrical wall telescoped over the cylindrical retainer, and pressure-responsive means for securing the cap to the retainer.

5. A unitary packing according to claim 4, said pressure-responsive means comprising radially extending dents on one cylindrical wall and openings in the other cylindrical wall adapted to receive the dents.

6. A unitary packing according to claim 4, and other pressure-responsive means axially spaced from the first-mentioned pressure-responsive means, and adapted to secure the cap to the retainer at a different axial location, whereby to change the pressure exerted upon the packing by the resilient means.

7. A unitary packing according to claim 6, the radially disposed wall of said cap in said different axial location abutting the end of the cylindrical wall of the retainer whereby said packing can be pressed into the means securing the retainer to one of said machine elements.